United States Patent [19]

Inagaki

[11] Patent Number: 4,864,920
[45] Date of Patent: Sep. 12, 1989

[54] VENTILATING PLATE UNITS TO BE ATTACHED TO VEHICLE WINDOW GLASSES

[76] Inventor: Moriaki Inagaki, Akasaka Shukusha 353, 2-17-10, Akasaka, Minato-ku, Tokyo, Japan

[21] Appl. No.: 165,914

[22] Filed: Mar. 9, 1988

[30] Foreign Application Priority Data

Mar. 10, 1987 [JP] Japan .................................. 62-33788

[51] Int. Cl.$^4$ ............................................. B60H 1/24
[52] U.S. Cl. .................................................... 98/2.13
[58] Field of Search ................................ 98/2.12, 2.13

[56] References Cited

U.S. PATENT DOCUMENTS

| | | | |
|---|---|---|---|
| 1,665,130 | 4/1928 | Elliott | 98/2.13 |
| 1,728,777 | 9/1929 | Trier | 98/2.13 |
| 2,628,549 | 2/1953 | Stelmach | 98/2.12 |
| 2,949,842 | 8/1960 | Crandall | 98/2.13 |
| 3,083,630 | 4/1963 | Thaxton | 98/2.12 |
| 3,730,070 | 5/1973 | Pedersen | 98/2.13 X |

Primary Examiner—Harold Joyce
Attorney, Agent, or Firm—Donald W. Hanson

[57] ABSTRACT

A ventilating plate unit comprises a plate member having ventilating holes formed therein, which is adapted to be fitted to an opening formed by partially opening the window glass of the vehicle.

6 Claims, 11 Drawing Sheets

VENTILATING PLATE UNITS TO BE ATTACHED TO VEHICLE WINDOW GLASSES

BACKGROUND OF THE INVENTION

1. Field of the Invention:

The present invention relates to ventilating plate units to be attached to vehicle window glasses, which when attached to vehicle window glasses, improve ventilation inside the vehicles, prevent stuffiness inside the vehicles, prevent invasion of insects into the vehicle interior inside and robbery, allow safe outdoor parking, and provide comfortable driving in the attached state.

2. Related Art Statement:

When vehicles are left outdoors, window glasses must completely be kept closed from the standpoint of safety. That is, even if a window glass is slightly opened, there is a fear that a door can be opened by inserting a wire or the like through an opening. However, if a window glass is tightly closed particularly in summer, there are the following problems. That is, a vehicle inside becomes very hot and stuffy. Consequently, articles placed inside the vehicle become damaged or decay. In addition, the vehicle must be started in a very unpleasant state. Furthermore, when a person takes a long rest or sleeps for a while in the vehicle in the state that a window glass is opened, there is a problem in that insects or the like enter the vehicle.

SUMMARY OF THE INVENTION

It is an object of the present invention to provide ventilating plate units which allow vehicles to be left outdoors while the vehicle interior is maintained in a well ventilated state.

It is another object of the present invention to provide ventilating plate units which prevent invasion of insects or the like into a vehicle interior and allow vehicles to be left outdoors while the vehicle interior is maintained in a well ventilated state.

It is still another object of the present invention to provide ventilating plate units which prevent robbery.

It is a further object of the present invention to provide ventilating plate units which allow comfortable driving even while being attached to vehicles.

These and other objects, features and advantages of the present invention will be appreciated upon reading of the following description of the invention when taken in conjunction with the attached drawings.

BRIEF DESCRIPTION OF THE ATTACHED DRAWINGS

For a better understanding of the invention, reference is made to the attached drawings, wherein.

DETAILED DESCRIPTION OF THE INVENTION

To meet the above-mentioned objects, the present invention is constituted by a plate member which is to be attached to an opening formed by partially opening a window glass of a vehicle and is provided ventilation holes. The plate member is used while being attached to the opening.

In the following, preferred embodiments according to the present invention will be explained with reference to the attached drawings.

Figure 1:
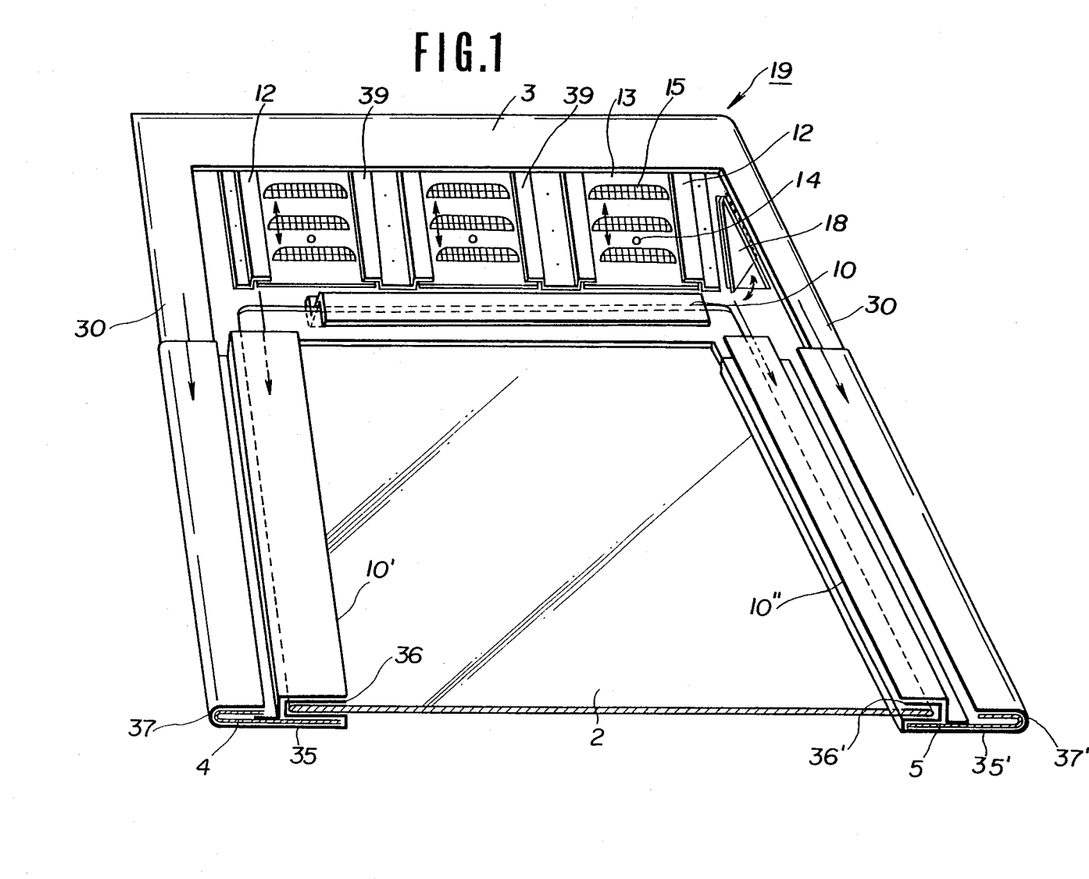
FIG. 1 is a rear view of an embodiment according to the present invention.
Figure 2:
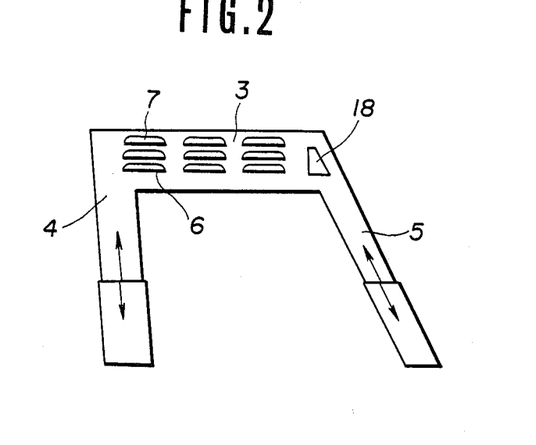
FIG. 2 is a front schematic view of the embodiment of the present invention.
Figure 3A:
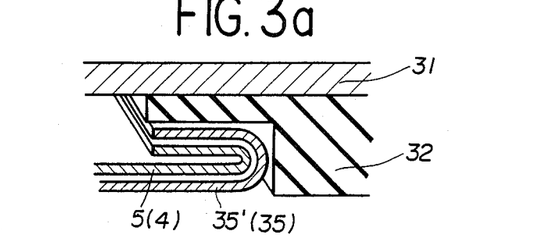
FIG. 3(a) is a sectional view showing that a ventilating plate unit according to the present invention is attached to a hard top type vehicle body instead of a window glass(a sectional view showing use of the ventilating plate unit according to the present invention)
Figure 3B:
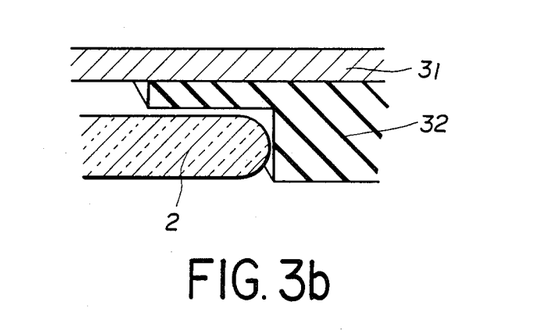
FIG. 3(b) is a sectional view showing a state in which a window glass is fitted to the hard top type vehicle body (a sectional view showing that the ventilating plate according to the present invention is not used)
Figure 4:
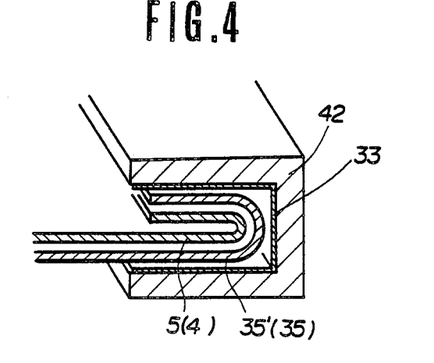
FIG. 4 is a sectional view showing a state in which a ventilating plate unit according to the present invention is attached to a sedan type vehicle body instead of a window glass.

As shown in FIGS. 1 and 2, a ventilating plate unit 19 according to the present invention is so constituted from metal plates by connecting inclined leg portions 4 and 5 to opposite ends of a slender horizontal portion 3 that the ventilating plate unit may conform with a shape of a space defined between a window glass-contacting face of a vehicle body and a window glass 2 when the window glass is lowered. Elongated ventilating holes 6 are bored in the horizontal portion, and folded portions 30 are formed at outer peripheral portions. The portion 30 is folded toward a vehicle interior. In the case of a hard top type vehicle body, as shown in FIG. 3, the folded portion is press fitted to a L-shaped section rubber member 32, as a vehicle body window glass-contacting face, which is fixed to the vehicle body 31. On the other hand, in the case of a sedan type vehicle, as shown in FIG. 4, the folded portion is fitted and engaged with a rectangular section window frame 42 through a water-proof cushion 33 adhered to a groove of the window frame. In summary, the ventilating plate unit according to the present invention is fitted to a window frame or a vehicle body instead of a window glass in any type of vehicles.

Figure 5A:
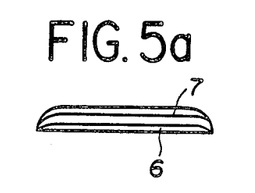
FIGS. 5(a), (b) and (c) are a rear view, a front view, and a sectional view of a ventilating hole, respectively.
Figure 5B:
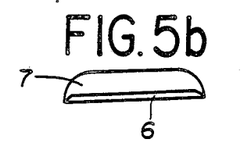
Figure 5C:
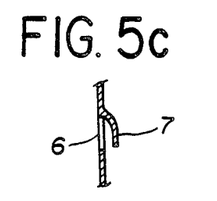

As shown in FIG. 5, the ventilating holes 6 are formed by punching a metal plate such that outwardly swelled portions 7 may be formed. By providing the swelled portions 7 in this way, rain water is effectively prevented from blowing into the vehicle inside.

Supporting members 10, 10' and 10" are fixed to the ventilating plate body at an upper face and opposite sides of the ventilating plate unit 19 on a vehicle room side by welding, screwing or the like, and are adapted to support a window glass. Each of the supporting members 10, 10' and 10" is formed by uprightly raising a plate body with respect to its fitting portion and bending its tip portion horizontally toward the window glass.

In order to more fully exhibit the function of the present invention, it is better that both the leg portions 4, 5 are designed extendable or foldable. However, such is not always necessary in the case of hard top type vehicles. Because, the ventilating plate unit can easily be attached, when a door is opened such that a window glass is slightly opened downwardly from an opening to which the ventilating plate is to be fitted, the ventilating plate unit is fitted to and supported by the window glass, and the window glass is raised again after the door is closed.

Figure 6:
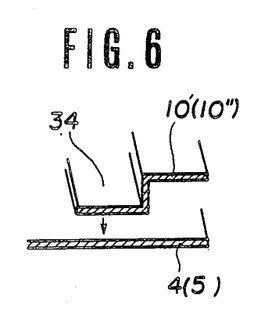
FIG. 6 is a view showing a state in which a supporting member is adhered to a leg portion.
Figure 7:
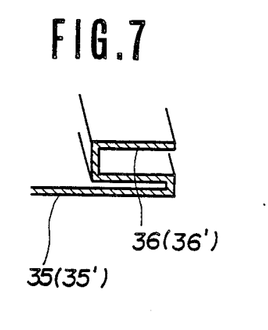
FIG. 7 is a sectional view showing a movable leg portion.
Figure 8:
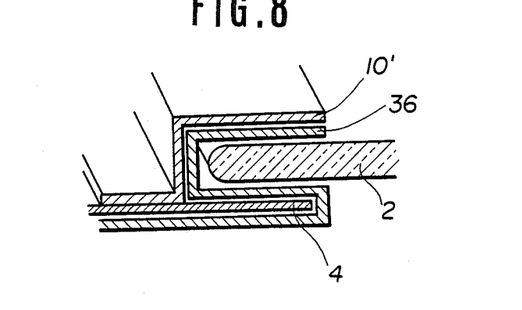
FIG. 8 is a sectional view showing engagement between a leg portion and a movable leg portion.
Figure 9:
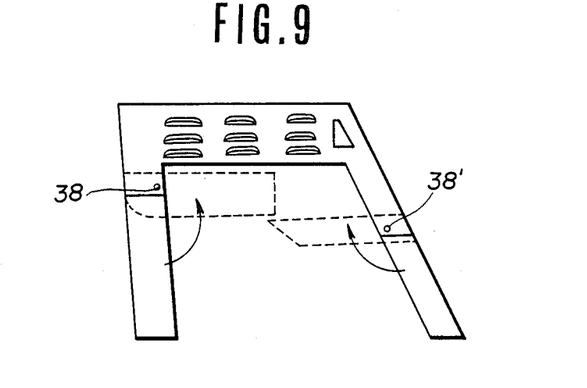
FIG. 9 is a front view showing how to fold leg portions in the present invention.

In order to make both the leg portions extendable, for instance, as shown in FIG. 6, the supporting members 10' and 10" are fixed to the leg portions 4 and 5 by welding 34, respectively, a window glass-supporting portion 36 of a movable leg portion 35 to be connected thereto is slightly erected from a plane of the movable leg portion to continuously form a fitting cylinder of a rectangular section, and the window glass-supporting portion 36 and the folded portion 37 of the movable leg portion are slidably fitted into the window glass support portions 10' or 10" and the folded portion 30 of the leg portions. By so constructing, the ventilating plate unit 19 is easily fitted to the window glass. In addition, this construction makes the fitting of the ventilating plate unit to the vehicle body easier. In order to make ventilating plate unit 19 foldable to be compact, as shown in FIG. 9, each of the leg portions 4 and 5 is constituted by separate members, which are connected at points 38 and 38' on the inner side, respectively, so that the leg portions may be erected or folded down around the connecting points as axis.

Figure 13:
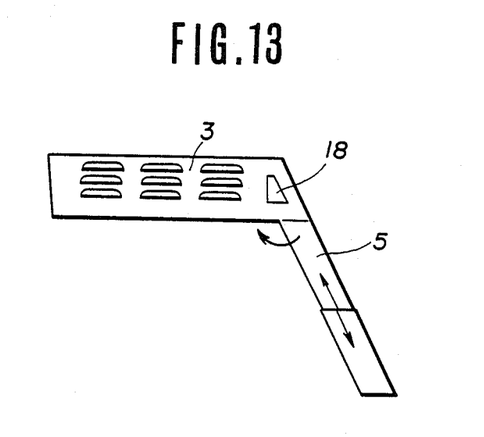
FIG. 13 is a front schematic view illustrating another embodiment according to the present invention.

This example is applicable to hard top type vehicles. In the case of sedan type vehicles, an opening is formed only at an upper portion and one side portion between a window glass and a window frame when the window glass is lowered. In this case, as shown in FIG. 13, the ventilating plate unit according to the present invention is designed to have a leg portion 5 on only one side to meet the shape of the opening. Therefore, in this case, it is better the horizontal portion and the leg portion are designed foldable when the foldable structure is to be employed.

Figure 10:
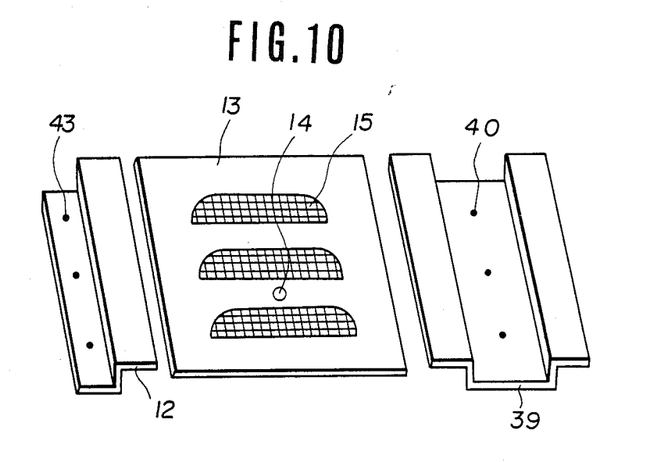
FIG. 10 is a exploded perspective view of a shutter in the present invention.

A shutter is fixed to the ventilating plate unit 19 on the vehicle interior side to shut the ventilating holes. As shown in FIG. 10, the shutter is formed by slidably holding a plate member 13 having net-like punched openings 15 with supporting members 12 and 39 at it opposite ends, respectively. The plate member 13 is upwardly or downwardly slided by grasping a knob attached to the plate member to close the ventilating holes 6 of the ventilating plate unit or cover them with the net-like openings 15. Each of the supporting members 12 at opposite sides is vertically erected from its fitting portion and the tip end is bent horizontally toward the plate member. The supporting member is welded to the ventilating plate unit at 43. A central supporting member 39 connects the supporting member 12 at the fitting portion, and slidably supports the plate body 13 at opposite sides. The central supporting member 39 is also fixed to the ventilating plate unit by welding at 40. In this way, insects or the like can be prevented from entering the vehicle room by opening the ventilating holes with the shutter in a network-like fashion. Further, when the ventilating holes are entirely closed with the shutter, wind can be prevented from entering the vehicle interior without closing the window glass.

Figure 11A:
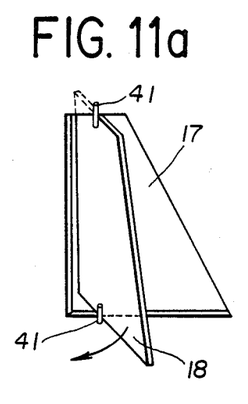
FIG.11(a) and (b) are views showing a circulator opened inside and outside, respectively.
Figure 11B:
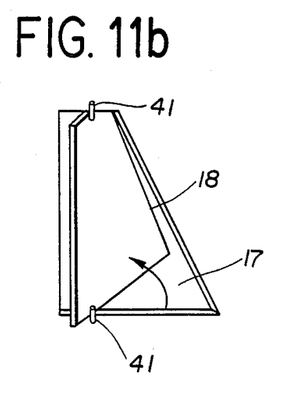

As shown in FIG. 11, an almost trapezoidal plate member 18 made of a metal plate is freely openable hinged at an almost trapezoidal opening 17 of a tip end portion of the horizontal portion of the ventilating plate unit by fitting upper and lower projections 41 at the central portion of the plate member into holes formed in the ventilating plate unit. By so constructing, a circulating function can be afforded to the ventilating plate unit during driving.

The ventilating plate unit may be provided with a crime-preventing system in which a horn, a bell, a pocket bell or the like rings when a human body or the like touches the ventilating plate unit.

Figure 12:
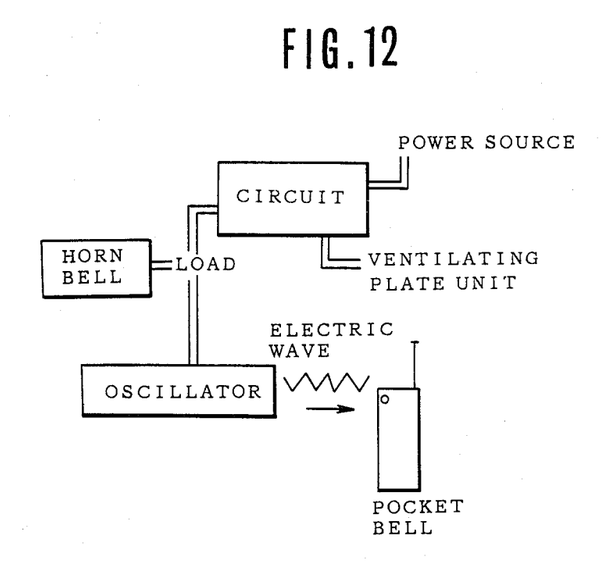
FIG. 12 is a block diagram showing a robbery-preventing system accordign to the present invention.

As such a crime-preventing system, for instance, a system as shown in FIG. 12 is available. That is, a battery is used as a power source, and a timer relay-equipped touch sensor which is turned on for a certain time period when a human body or the like touches the ventilating plate unit or a timer relay-equipped vibration sensor which is turned on for a certain time period when an iron plate is vibrated is connected to the power source. When the sensor is turned on, the crime-preventing or repluse horn, bell or the like which is connected to a load rings and at the same time an oscillator also connected to the load is actuated to ring a pocket bell to make a driver know that. The above circuit may be formed by connecting a timer relay to a circuit using a known touch sensor switch or a vibration sensor switch. The power source may be turned on or off by a remote control switch, a door lock-interlocking switch, a door-interlocking room lamp switch or the like. In the case of the timer relay-equipped touch sensor switch, the iron ventilating plate unit needs to be insulated. In the above embodiment, since the ventilating plate unit is surrounded by insulating materials of glass and rubber or a water-proof cushion material, the insulating plate is maintained in an insulated state. As mentioned in the above, since the crime-preventing system attached is turned on not only when a human body touches the ventilating plate unit but also when the window glass is broken, crime prevention and robbery prevention can completely be attained.

Figure 16:
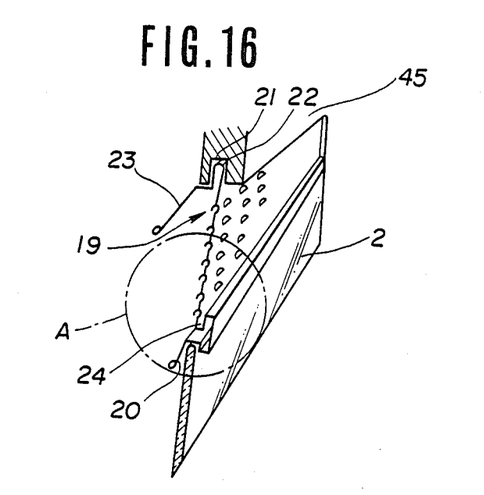
FIG. 16 is a front view showing still another embodiment according to the present invention.
Figure 17:
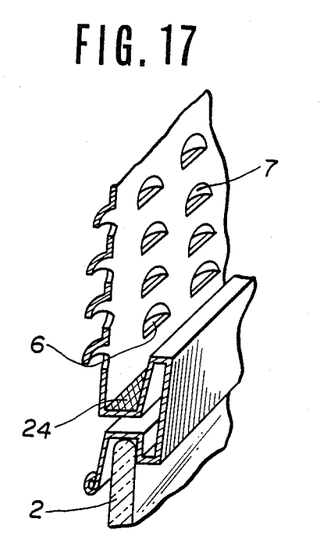
FIG. 17 is a partially enlarged perspective view of FIG. 16 in a portion A.

FIGS. 16 and 17 show another embodiment according to the present invention. A ventilating plate unit 19 is formed in such a shape that the ventilating plate unit may conform with a space defined by a window glass 2 and a window frame 45 of a vehicle. A fitting groove portion 20 is connected to a lower end portion of the ventilating plate unit 19 for fitting and holding the window glass 2 thereto, while a fitting projection 22 which is inserted into a recess 21 of the window frame and a penthouse or overhang 23 projecting outside the vehicle are connected to the upper end of the ventilating plate unit for preventing blowing-in of rain water inside the vehicle interior. In FIGS. 16 and 17, a reference numeral 24 is a rain water discharge groove with a net-like bottom, and is adapted to discharge rain water blown into the vehicle interior and falling down outside the vehicle interior through the bottom net.

As mentioned in the above, in the embodiment of FIGS. 16 and 17, since the penthouse 23 is provided, rain water is prevented from blowing into the vehicle interior and a small amount of rain water entering the vehicle interior is effectively discharged outside the vehicle through the net at the bottom of the rain water discharge recess.

Figure 23:
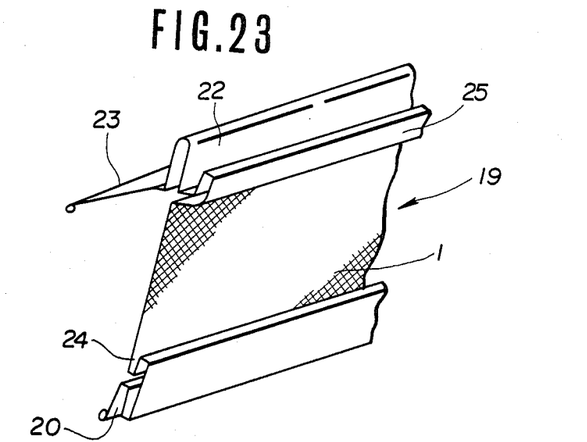
FIG. 23 is a perspective view of a still further embodiment according to the present invention.

Although the ventilating plate unit according to the present invention may be produced from an appropriate material such as a metal or a plastic material, the above embodiment is integrally constituted by bending a punched stainless metal net. Alternatively, as shown in FIG. 23, a ventilating plate unit 19 may be constituted by punching an iron plate. The ventilating plate unit shown in FIG. 23 is constituted in the same manner as in FIGS. 16 and 17 except that in addition to the above difference, a stopper 25 is connected thereto for preventing a fitting projection 22 from entering at a depth exceeding a preset range. As a matter of course, a portion of the ventilating plate unit to which rain water downwardly falls from the penthouse 23 or the rain water discharge groove 24 is not provided with a net to prevent invasion of rain water.

As shown in FIG. 17, the ventilating holes 6 are partially covered with outwardly swelled portions 7. By so doing, rain water hardly blows inside and a vehicle interior is difficult to see from the outside.

The size and shape of the ventilating plate unit are selected to closely fit it to a vehicle. It is preferable that opposite sides of the ventilating plate unit are inserted or butted to opposite sides of the window frame.

Figure 18:
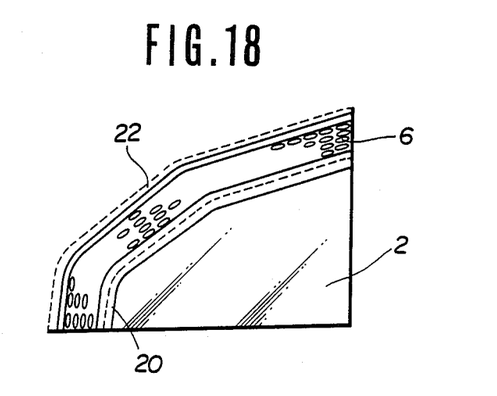
FIG. 18 is a front view showing a further embodiment according to the present invention.

FIG. 18 shows a further embodiment according to the present invention. In this example, a ventilating plate unit is applied to a case where a window glass is opened to form an opening at its upper and front portions. A fitting projection 22 and a fitting recess 20 are formed as fitting faces for a vehicle window frame and a window glass 2, respectively. The entire ventilating plate unit is constructed in such a shape to meet with the opening.

Figure 19:
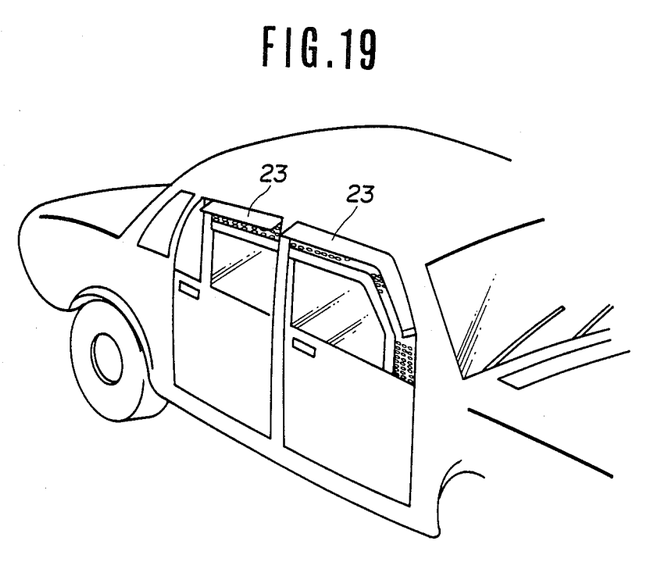
FIG. 19 is a perspective view showing a state in which a ventilating plate unit according to the present invention is attached to a window glass of a vehicle.

When a window glass is opened to form an opening at its front or rear portion as in the above embodiment, as shown in FIG. 19, a penthouse 23 is inclined forwardly or rearwardly to conform with the opening of the window glass.

Figure 20:
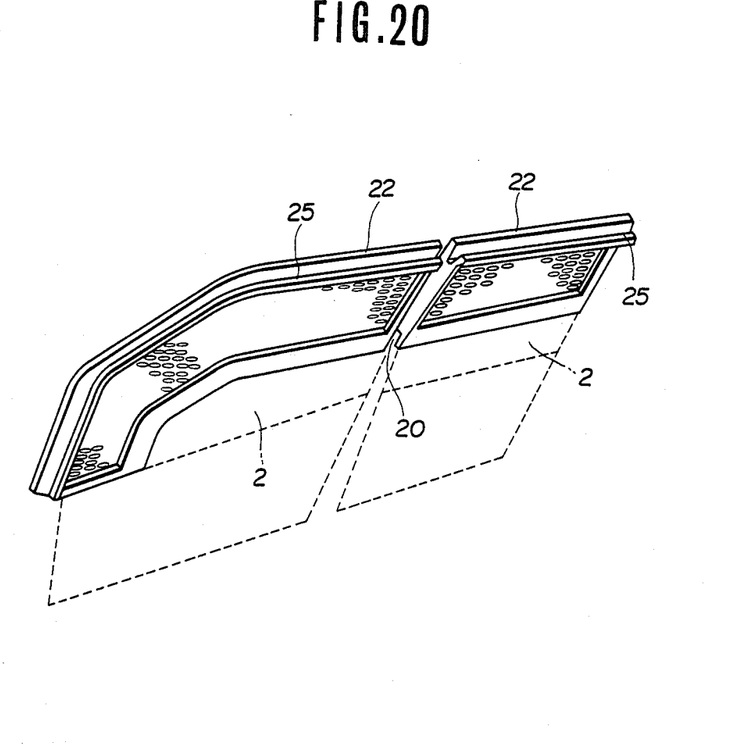
FIG. 20 is perspective views of still further embodiments according to the present invention.

FIG. 20 illustrate a still further embodiment according to the present invention. A fitting projection 22 is formed at a contact face of a ventilating plate unit for a window frame of a vehicle. A fitting recess 20 is formed at a contact face for a window glass 2. A stopper 25 is connected to the fitting projection 22.

Figures 21, 22:
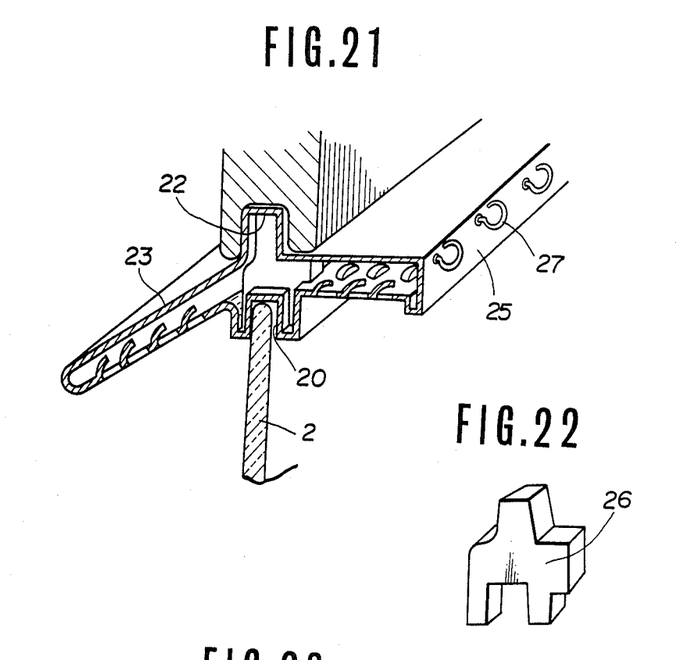
FIG. 21 is a sectional view showing a still further embodiment according to the present invention.
FIG. 22 is a perspective view of a supporting plate.

FIG. 21 illustrates a still further embodiment according to the present invention, which is constituted by bending a net-like plate body. A fitting recess 20 and a fitting projection 22 are formed at contacting faces for a window glass 2 and a window frame of a vehicle, respectively. A penthouse 23 and a stopper 25 are connected at the vehicle outside and inside, respectively. In this figure, a reference numeral 27 is a hook for attaching a curtain or the like, which is convenient when a person sleeps for a while with the curtain being drawn. Instead of an ordinary curtain, a roll-in type curtain may be of course used, which is used in windows of electric cars.

Since such ventilating plate units may readily be obtained in a desired bent shape, the ventilating plate units are particularly suited in a case where they are fitted to window frames in which an opening is also formed in a front or rearward portion. In the above-mentioned embodiment, the lower portion only is designed in a net-like fashion, but the entire portion may be designed in a net-like fashion.

Since a hollow space is formed in the above-mentioned embodiment, as shown in FIG. 22, supporting members 26 which conform with the interior hollow shape are fitted at appropriate locations to increase strength of the ventilating plate unit.

Furthermore, fitting grooves for a ventilating plate unit are formed adjacent to window glass-fitting grooves in a window frame so that the ventilating plate unit may be fitted to the former grooves and be adapted to be vertically moved like a power window.

Next, the functions of the present invention as constructed above will be explained with respect to the embodiments shown in FIGS. 14 and 15.

Figure 14A:
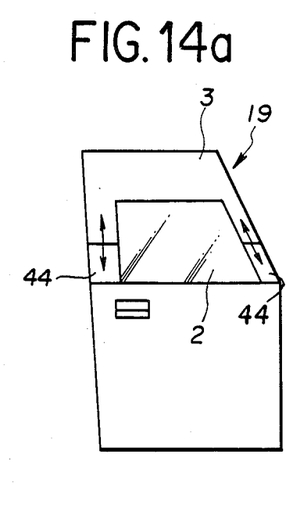
FIG. 14(a) is a schematic view showing attachment of a ventilating plate according to the present invention to a window glass of a hard top type vehicle body, FIGS. 14(b) and (c) being schematic views illustrating embodiments of ventilating plate units according to the present invention.
Figure 14B:
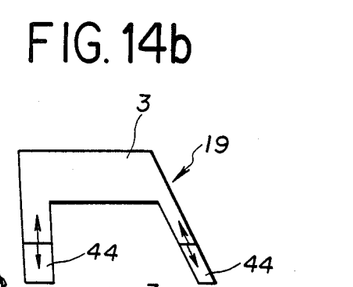
Figure 14C:
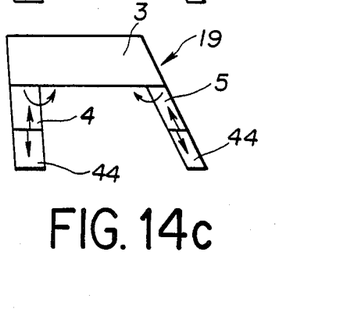

FIG. 14 illustrates an example of the ventilating plate unit according to the present invention being fitted to the hard top type vehicle. Further, FIGS. 14(b) and (c) shows the ventilating plate units according to the present invention. In the ventilating plate unit shown in FIG. 14(b), leg portions 4 and 5 are slidably engaged with the horizontal portion. In the ventilating plate unit shown in FIG. 14(c), the leg portions 4 and 5 are foldable with respect to the horizontal portion thereof and the movable leg portions 44 are slidably engaged with the leg portions 4 and 5. When the ventilating plate unit is to be folded, the movable leg portions 44 are raised and then the leg portions 4 and 5 are folded up.

In order to fit the ventilating plate unit to the window glass, the leg portions are erected and the slidable leg portions are slid downwardly. Then, the window glass 2 of the vehicle is lowered to form an opening slightly larger than the area of the ventilating plate unit, and the door is opened. The ventilating plate unit is engaged with the window glass at the fitting grooves of the supporting members. Thereafter, the door is shut, the window glass is raised. By so doing, the ventilating plate unit according to the present invention press contacts, as a part of the window glass, with the rubber fixed to the vehicle body instead of the window glass. Thereby, the ventilating plate unit functions as the window glass. The movable leg portions may be extended after the ventilating plate unit is fitted to the window glass.

Figure 15A:
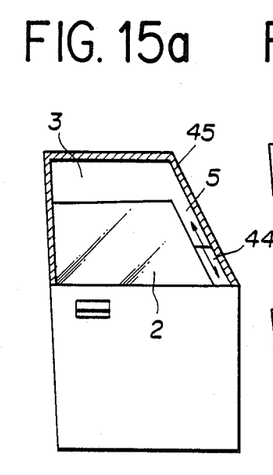
FIG. 15(a) is a schematic view showing attachment of a ventilating plate unit according to the present invention to a window glass of a sedan type vehicle body, FIGS. 15(b) and (c) being schematic views illustrating embodiments of ventilating plate units according to the present invention.
Figure 15B:
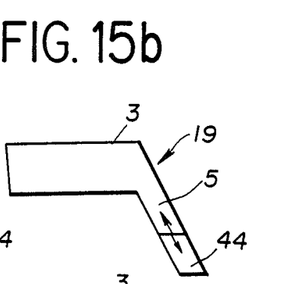

FIG. 15 illustrates an example in which the ventilating plate unit according to the present invention is fitted to the sedan type vehicle body. The side portion of the ventilating plate is fitted to the window frame 45, and the ventilating plate unit 19 is slid upwardly to fit and engage it to the window frame. Then, when the window glass 2 is raised, the window glass 2 engages with and supports the supporting members of the ventilating plate unit 19. Thereafter, the movable leg portion is 44 slid downwardly. By so doing, the ventilating plate according to the present invention functions as the window glass in a part of the window frame.

Figure 15C:
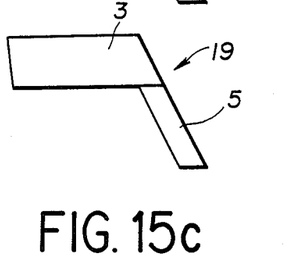

In the ventilating plate unit shown in FIG. 15(c), the horizontal portion 3 and a leg portion 5 of the ventilating plate unit are foldable to each other, and the movable leg portion 44 is slidably fitted to the leg portion 5. In order to attach the ventilating plate unit to the window glass, the plate unit is engaged with the window frame in a folded state, the leg portion 5 is erected, and then the window glass on opposite sides is raised.

When a vehicle, to which the ventilating plate units according to the present invention were attached at opposite side front window glasses was left under a blazing sun at an outside temperature 40 ° C. for 5 hours, the temperature at a room mirror inside the vehicle was 40 ° C. which was the same as the outside temperature. To the contrary, when the vehicle to which the ventilating plate units were not attached, the temperature at the room mirror was raised to 75 ° C.

As mentioned in the afore-going explanation, according to the ventilating plate units of the present invention, vehicles can be maintained with safety by an extremely simple construction while a part of window glasses is opened. Thus, for instance, particularly when the vehicle is left for a long time in the summer or when a person takes a rest or a sleep for a long time interior the vehicle, the vehicle inside can be maintained in a safe and comfortable state. Furthermore, since functions by which wind can arbitrarily be taken in or prevented from entering the vehicle can be afforded to the vehicle, the vehicle can be driven comfortably even when the ventilating plate unit is attached to the vehicle during running. In addition, when the crime-preventing system is attached, robbery can completely be prevented.

What is claimed is:

1. A ventilating plate unit having ventilating holes to be attached to a partly opened window glass of a vehicle, wherein said unit includes a ventilating plate which comprises a horizontal portion having two ends and provided with a large number of long ventilating holes running therethrough and a leg portion connected to at least one end of said horizontal portion and projecting thereform, said leg portion comprising a slidingly movable leg portion engagedly connected to the end thereof, said ventilating plate unit further comprising a plate body slidably fitted on a back side of the ventilating plate and having grid-like openings spaced apart from each other and said plate body comprising a support member for engagingly supporting said window glass on the surface that abuts the window glass.

2. A ventilating plate unit to be attached to a window glass of a vehicle according to claim 1, wherein said ventilating holes are punched to form outwardly swelled portions.

3. A ventilating plate unit to be attached to a window glass of a vehicle according to claim 1, wherein an opening is formed in the ventilating plate, a plate member is openably attached to said opening to afford a circulating function afforded to said opening.

4. A ventilating plate unit to be attached to a window glass of a vehicle according to claim 1, wherein the lower end portion of said ventilating plate is bent to form a rain water drainage groove on the back side and a groove at the bottom for engagedly supporting the lower end of the window glass, the bottom portion of said rain water drainage groove having a grid-like configuration.

5. A ventilating plate unit to be attached to a window glass of a vehicle according to claim 1, wherein said ventilating plate is made of a metal plate, and further including a timer relay-equipped touch sensor switch having a circuit and a battery as an energy source is attached to said ventilating plate in such a manner that the ventilating plate is touched by a portion of a human body, the circuit of the switch is closed for a predetermined time to activate an oscillator of a crime preventing type repulsing sound generating device connected thereto so as to emit an alarm sound 6. A ventilating plate unit to be attached to a window glass of a vehicle according to claim 5, wherein the sound generating device comprises one or more of a horn, bell or pocket bell.

* * * * *